US007284698B2

(12) United States Patent
Sogo

(10) Patent No.: US 7,284,698 B2
(45) Date of Patent: Oct. 23, 2007

(54) GATE SYSTEM

(75) Inventor: Koji Sogo, Otsu (JP)

(73) Assignee: OMRON Corporation (JP)

( * ) Notice: Subject to any disclaimer, the term of this patent is extended or adjusted under 35 U.S.C. 154(b) by 129 days.

(21) Appl. No.: 11/066,357

(22) Filed: Feb. 25, 2005

(65) Prior Publication Data

US 2005/0205668 A1 Sep. 22, 2005

(30) Foreign Application Priority Data

Feb. 27, 2004 (JP) ............................ 2004-053138

(51) Int. Cl.
*G06K 5/00* (2006.01)

(52) U.S. Cl. ...................................... 235/382; 235/384

(58) Field of Classification Search ................ 235/382, 235/382.5, 380, 375, 487, 485; 705/13, 67; 382/118

See application file for complete search history.

(56) References Cited

U.S. PATENT DOCUMENTS

| | | | | |
|---|---|---|---|---|
| 6,119,096 | A * | 9/2000 | Mann et al. | 705/5 |
| 6,698,653 | B1 * | 3/2004 | Diamond et al. | 235/375 |
| 6,779,721 | B2 * | 8/2004 | Larson et al. | 235/382 |
| 2002/0016740 | A1 * | 2/2002 | Ogasawara | 705/26 |
| 2002/0095588 | A1 * | 7/2002 | Shigematsu et al. | 713/186 |
| 2002/0103765 | A1 * | 8/2002 | Ohmori | 705/67 |
| 2002/0191817 | A1 * | 12/2002 | Sato et al. | 382/118 |
| 2003/0039380 | A1 * | 2/2003 | Sukegawa et al. | 382/118 |
| 2003/0052163 | A1 * | 3/2003 | Habara et al. | 235/380 |
| 2004/0034644 | A1 * | 2/2004 | Ohsawa et al. | 707/100 |

FOREIGN PATENT DOCUMENTS

JP 2002-279455 A 9/2002

* cited by examiner

*Primary Examiner*—Thien M. Le
*Assistant Examiner*—Edwyn Labaze
(74) *Attorney, Agent, or Firm*—Dickstein Shapiro LLP

(57) ABSTRACT

It is intended to provide a gate system which prevents an abuse of a storage medium such as a card carried by a user to pass through a gate and reduces the time to require for determining whether to permit passing so as not to cause jams when passing through the gate. The gate system includes: a user identification apparatus which identifies a registered user who is matched with a user who wants to pass through a gate from registered users; and a gate apparatus which forms the gate, wherein the user identification apparatus includes: an image pickup means which takes an image of the face of a passing user before the user reaches the gate; identification and verifying means which identifies a registered user from the taken image; and medium information sending means which sends medium information about a storage medium carried by the registered user to the gate apparatus, the information being stored in association with the identified registered user, and the gate apparatus includes: medium information receiving means which receives the medium information from the user identification apparatus; medium reading means which reads the medium information from the storage medium carried by the passing user; and validating and verifying means which verifies the read medium information against the received medium information by the medium information receiving means.

8 Claims, 11 Drawing Sheets

REGISTERED USER DATA 71

| CARD ID NUMBER | VALID DURATION | PASSABLE GATE | FACE DATA |
|---|---|---|---|
| 00001 | 2000.01.01 ~2003.12.31 | A,C,D |  |
| 00002 | 2001.03.21 ~2004.09.20 | A,B,D,E |  |
| 00003 | 2003.09.21 ~2004.01.31 | A,B,E |  |
| ⋮ | ⋮ | ⋮ | ⋮ |

FIG. 4

VERIFIED DATA 72

| RECEIVED TIME | CARD ID NUMBER | VALID DURATION | PASSABLE GATE |
|---|---|---|---|
| 8 : 10 | 16853 | 2000.01.01 ~2003.12.31 | A,C,D |
| 8 : 10 | 32594 | 2001.03.21 ~2004.09.20 | A,B,D,E |
| 8 : 10 | 32015 | 2003.09.21 ~2004.01.31 | A,B,E |
| 8 : 16 | 10257 | 2000.01.01 ~2003.12.31 | A,C,D |
| 8 : 16 | 02305 | 2001.03.21 ~2004.09.20 | A,B,D,E |
| 8 : 16 | 03694 | 2003.09.21 ~2004.01.31 | A,B,E |
| 8 : 17 | 39021 | 2000.01.01 ~2003.12.31 | A,C,D |
| 8 : 17 | 89500 | 2001.03.21 ~2004.09.20 | A,B,D,E |
| 8 : 17 | 20380 | 2003.09.21 ~2004.01.31 | A,B,E |
| ⋮ | ⋮ | ⋮ | ⋮ |

FIG. 9

VERIFIED DATA 72

| RECEIVED TIME | CARD ID NUMBER | VALID DURATION | PASSABLE GATE | GROUP DATA |
|---|---|---|---|---|
| 8 : 10 | 16853 | 2000.01.01 ~2003.12.31 | A,C,D | 000A |
| 8 : 10 | 32594 | 2001.03.21 ~2004.09.20 | A,B,D,E | |
| 8 : 10 | 32015 | 2003.09.21 ~2004.01.31 | A,B,E | |
| 8 : 16 | 10257 | 2000.01.01 ~2003.12.31 | A,C,D | 000B |
| 8 : 16 | 02305 | 2001.03.21 ~2004.09.20 | A,B,D,E | |
| 8 : 16 | 03694 | 2003.09.21 ~2004.01.31 | A,B,E | |
| 8 : 17 | 39021 | 2000.01.01 ~2003:12.31 | A,C,D | 000C |
| 8 : 17 | 89500 | 2001.03.21 ~2004.09.20 | A,B,D,E | |
| 8 : 17 | 20380 | 2003.09.21 ~2004.01.31 | A,B,E | |
| ⋮ | ⋮ | ⋮ | ⋮ | ⋮ |

GATE SYSTEM

PRIORITY

This application claims priority to co-pending Japanese Patent application no. JP 2004-053138, which is hereby incorporated by reference.

BACKGROUND OF THE INVENTION

1. Field of the Invention

The present invention relates to a gate system which is disposed at main entrances of structures such as buildings, stations and amusement facilities, and at entrances to areas such as a security room, and conducts entrance control over unauthorized users not to enter.

2. Description of the Related Art

Traditionally, an automatic ticket gate is proposed as a gate apparatus for entrance control which reads and checks information on a card medium such as a commuter pass for control over entrance to a station.

As the automatic ticket gate, an automatic ticket gate is proposed which checks commuter pass information read by the automatic ticket gate, verifies face image data read by the automatic ticket gate against face image data of a user taken by a camera and determines whether to allow the user to pass or not when the user is to pass through the automatic ticket gate with the commuter pass (see Patent Reference 1).

The purpose of this automatic ticket gate is to prevent abuse, for example, of a person who picked up, and tries to use another person's commuter pass as if that person is the user himself/herself to pass through the automatic ticket gate.

[Patent Reference 1] JP-A-2002-279455

SUMMARY OF THE INVENTION

However, the automatic ticket gate described above verifies face image data to determine whether to pass or not in addition to checking commuter pass information when a user passes through the automatic ticket gate.

Therefore, a problem arises that it takes time to verify the face, requiring longer time for determining whether to permit passing through the automatic ticket gate or not.

In addition, a problem arises that the number of people to pass per unit time is reduced, causing the entrance of the automatic ticket gate to be crowded.

An object of the invention is to provide a gate system which prevents abuse of a storage medium such as a card carried by a user to pass through a gate and reduces the time to be required for determining whether to permit passing through the gate or not, with no crowding at the gate when passed.

The invention is a gate system including:

a user identification apparatus which identifies a registered user who is matched with a user who wants to pass through a gate from registered users; and a gate apparatus which forms a gate, wherein the user identification apparatus includes:

image pickup means which takes an image of the face of the passing user before the user reaches the gate;

identification and verifying means which identifies a registered user from the taken image; and medium information sending means which sends medium information about a storage medium carried by the registered user to the gate apparatus, the information being stored in association with the identified registered user, and the gate apparatus includes:

medium information receiving means which receives the medium information from the user identification apparatus;

medium reading means which reads medium information from a storage medium carried by a user to pass; and validating and verifying means which verifies the read medium information against the medium information received by the medium information receiving means.

The medium information is information such as ID information that is uniquely assigned to and stored in the medium for identifying thereof, and comprises information about the storage medium such as information to be stored in the storage medium.

By the configuration, the identification and verifying means of the user identification apparatus identifies the passing user before the user reaches the gate from the face of the user, and thus the abuse of the gate system can be prevented. The medium information makes it possible to confirm whether the user who lets the gate apparatus read the medium information is the identified user, and thus it is surely determined whether to permit passing through the gate or not in a short time.

An embodiment according to the invention is a gate system including:

a user identification apparatus which identifies a registered user who is matched with a user who wants to pass through a gate from registered users; and a gate apparatus which opens/closes a gate, wherein the user identification apparatus includes:

registered user data storing means which stores face information of multiple registered users in association with the medium information of a storage medium carried by a registered user;

image pickup means which takes an image of the face of the passing user before the user reaches the gate;

face information extracting means which extracts face information about the passing user from the taken image;

identification and verifying means which verifies the extracted face information against the face information of the registered users stored in the registered user data storing means and identifies a matched registered user; and medium information sending means which sends the medium information of the identified registered user to the gate apparatus, and the gate apparatus includes:

medium information receiving means which receives the medium information from the user identification apparatus;

medium information storing means which stores the received medium information;

medium reading means which reads medium information from the storage medium carried by the passing user;

validating and verifying means which verifies the read medium information against the medium information stored in the medium information storing means; and gate control means which drive controls the opening/closing of the gate based on the verification result of the validating and verifying means.

By the configuration, identification and verification can be conducted before the user who wants to pass reaches the gate, to be identified whether the passing user is matched with the registered user. Then, the relevant medium information is stored in the medium information storing means of the gate apparatus until the user who wants to pass reaches the gate, and the storage medium can be verified based on smaller number of medium information than the number of the registered users to determine whether to permit passing or not at a high speed.

For an embodiment according to the invention, the gate apparatus can be provided with medium information deleting means which deletes the medium information stored in the medium information storing means at a given time.

The given time can be set appropriately, for example, to the time when it is determined there is that the medium information of a registered user corresponding to the passing user, or the time when a given time period has elapsed since the medium information was stored in the medium information storing means.

By the configuration, unnecessary medium information to be stored in the medium information storing means of the gate apparatus can be deleted to prevent the expansion of the medium information referred for validation and verification.

Furthermore, for an embodiment according to the invention, when multiple passing users are in the taken image, extracting face information done by the face information extracting means of the user identification apparatus can be executed on all the passing users.

Therefore, multiple people are allowed to pass at a high speed, and whether to permit passing or not can be determined at a high speed with no problem even though multiple gates to be passed are arranged side by side.

Moreover, for an embodiment according to the invention, the identification and verifying means of the user identification apparatus can be set so as to identify multiple potential users as registered users matched with users to pass, and the user identification apparatus can be provided with group creating means which gives a single group information to the identified multiple potential users, so that, medium information of each of the identified potential users and the group information can be together set as the information sent by the medium information sending means of the user identification apparatus, and a delete process executed by the medium information deleting means of the gate apparatus can be executed by unit of groups.

Therefore, the registered users can be identified properly even though changes are observed in the faces by eyeglasses and hairstyles.

Thus, even in this case, the medium information showing that users are allowed to pass through the gate apparatus includes that person's information, and the person is allowed to pass.

In addition, as an embodiment according to the invention, passage relating information of whether to allow a registered user to pass the gate or not can be stored in the registered user data storing means of the users identification apparatus, and the validating and verifying means of the gate apparatus can be set so as to turn the determination result whether to permit passing or not based on the passage relating information relating to the verified medium information to a verification result.

The passage relating information can be information about the period during which passing is allowed, the expiration of passing, the passable gate when multiple gates exist and users passable through the gates are varied depending on the respective gates, or any combinations thereof.

By the configuration, whether to permit passing or not can be determined in accordance with passage authorization set to the registered user.

Besides, as an embodiment according to the invention, the gate apparatus includes blacklist storing means which stores medium information of storage media to be rejected to pass, and the validating and verifying means of the gate apparatus is set so that as a condition to determine as passing permissible, medium information read from the storage medium is not matched with the medium information stored in the blacklist storing means.

Therefore, the storage medium having the history of abuse can be registered in a blacklist to reject it to pass.

According to the invention, a gate system can be provided which can prevent the abuse of storage medium and does not generate any jam when users pass through the gate.

BRIEF DESCRIPTION OF THE DRAWINGS

The invention can be readily understood by considering the following detailed description in conjunction with the accompanying drawings, in which:

FIG. 4 is a data configuration diagram illustrating verified data;

FIG. 9 is a data configuration diagram illustrating verified data of another embodiment;

DESCRIPTION OF THE PREFERRED EMBODIMENT

An embodiment according to the invention will be described with reference to the accompanying drawings.

First, the system configuration of a gate system 1 will be described with reference to a perspective view of the appearance thereof shown in FIG. 1.

Figure 1:
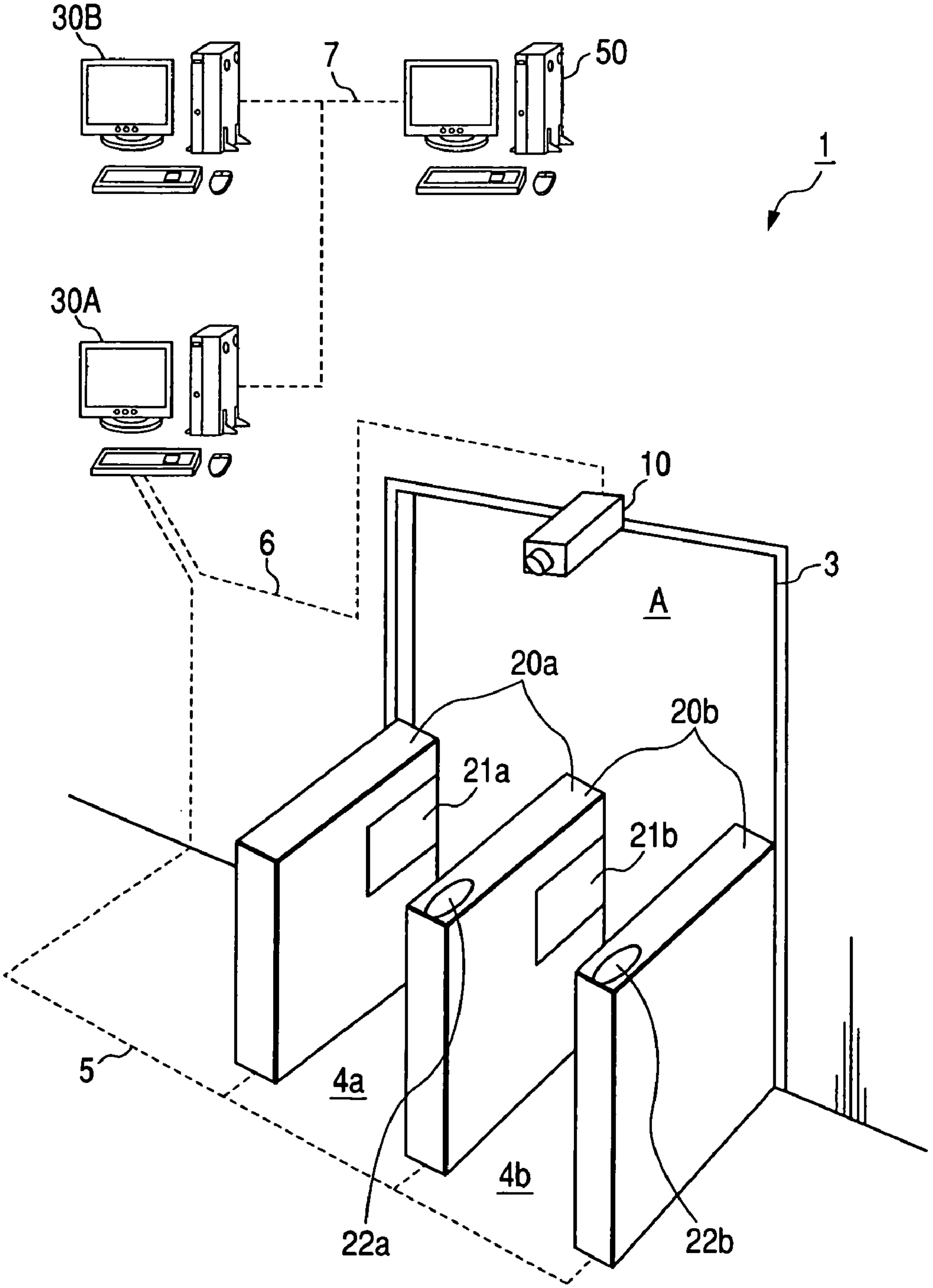
FIG. 1 shows a perspective view of the appearance of the system configuration of a gate system.

In FIG. 1, the gate system 1 is shown which is constructed in facilities having multiple areas with different security levels in which users allowed to enter are varied for each area (rooms). The system configuration is shown centering on a gate A provided at an entrance 3 of a certain area, omitting other gates B, C, and so on in the drawing.

In the gate system 1, a plurality of user identification apparatus 30 (30A, 30B, and so on) each provided to the respective gates A, B, and so on are connected to a server 50 with a cable 7.

Each user identification apparatus 30 includes a camera 10 connected with a cable 6 and a plurality of gate apparatus 20 (20*a*, 20*b*) connected with a cable 5.

Furthermore, the number of the gate apparatus 20 provided to a single user identification apparatus 30 is defined by the number of people allowed to pass through that gate. Therefore, it is so configured that many gate apparatus 20 are provided at the entrance gate of a facility where a large number of people come in and out and that a single gate apparatus 20 is provided at the entrance gate of an area of high security level where the number of people allowed to pass is small.

The camera 10 is a CCD camera that can take moving and static images and is disposed so as to take the face image of a user who is entering the entrance 3 of the facility.

The camera 10 is disposed at an upper center part of a frame of the entrance 3 as its shooting direction is set obliquely downward on the front side, and can take the users who are to pass through passage gates 4*a*, 4*b* before they reach the passage gates 4*a*, 4*b* totally.

Thus, the camera 10 takes multiple users passing through the entrance 3 regardless of which passage gates 4*a*, 4*b* they are going to pass, and an image of multiple users is obtained.

Figure 3:
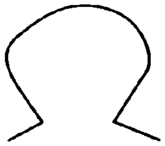
FIG. 3 is a data configuration diagram illustrating registered user data.
Figure 3:
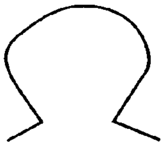
Figure 3:
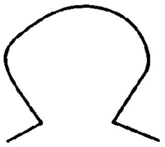

Moreover, the user identification apparatus 30 stores registered user data as shown in FIG. 3 in which card data of a noncontact IC card 15 carried by a registered user is stored association with the registered user's face data.

Therefore, a user who is going to pass is identified with the face data extracted from the image taken by the camera 10 and the stored face data, and the card data of the identified user can be sent as verified data to the gate apparatus 20.

The gate apparatus 20 has a first gate apparatus 20*a* disposed so as to form an aisle as sandwiching the passage gate 4*a* and a second gate apparatus 20*b* disposed so as to form an aisle as sandwiching the passage gate 4*b*.

Each gate apparatus 20 has a card reading part 22 (22*a*, 22*b*) which performs data communication with the noncontact IC card 15 in a noncontact manner at the right front with respect to the user to pass.

Furthermore, gate doors 21 (21*a*, 21*b*) are disposed on the back side of each gate apparatus 20 which is opened and closed depending on the determination whether to permit passing or not. Two gate doors 21 are provided to each gate apparatus 20 symmetrically; they are opened as shown in the drawing when instructed to open by a control signal from a gate-side control part 26, whereas they reject passing by pivoting in a rectangular shape with no base seen in plane when closed.

The user identification apparatus 30 is configured of a personal computer and is disposed so as to be operated by a security guard or the like near the entrance 3.

The server 50 is configured of a server-type computer, and is disposed at a different place such as a system control room for management of the noncontact IC cards 15 distributed to users and for setting whether to permit passing or not.

The configuration above allows the camera 10, the gate apparatus 20, and the user identification apparatus 30 to monitor unauthorized users so as not to enter the entrance 3.

Maintenance such as assignment and deletion of passage authorization to users can be conducted with the server 50, and update processing can be done on allows the user identification apparatus 30 with the server 50.

Figure 2:
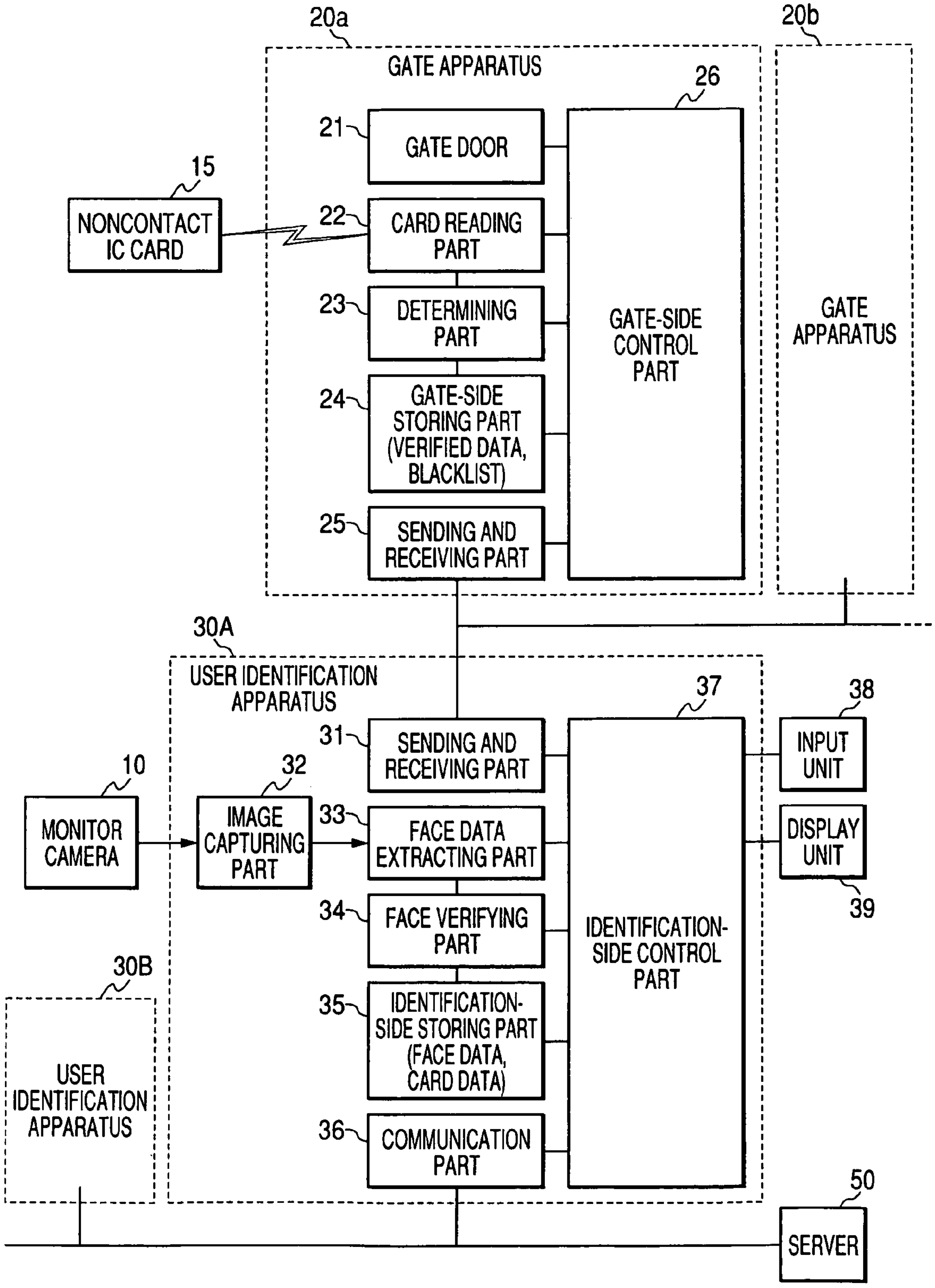
FIG. 2 is a block diagram illustrating the configuration of the gate system.

Next, the configuration of the gate system 1 formed of the camera 10, the gate apparatus 20, the user identification apparatus 30, and the server 50 will be described with reference to a block diagram shown in FIG. 2.

The gate apparatus 20 is configured to connect the gate door 21, the card reading part 22, a determining part 23, a gate-side storing part 24, and a sending and receiving part 25 to the gate-side control part 26.

The gate door 21 is configured of a plate body which physically restricts users from passing and a driving device which operates the plate body to open and close. The open and close operation of the plate body is executed in accordance with an open/close control signal from the gate-side control part 26.

The card reading part 22 conducts radio communication with the noncontact IC card 15 and an antenna, and reads data stored in the storing part of the noncontact IC card 15. Furthermore, the noncontact IC card 15 is configured of an IC chip having a storing part and an antenna serving as communication means, and receives via the antenna control signal from the card reading part 22 as well as electromotive force for driving.

The determining part 23 executes a determination process to determine whether the read noncontact IC card 15 has an authorization to pass.

The gate-side storing part 24 is configured of a storage device such as a flash memory and a hard disc, and stores verified card data relating to a verified noncontact IC card sent from the user identification apparatus 30 and blacklist data relating to a noncontact IC card not to be allowed to pass.

Moreover, the blacklist data is configured of a card ID number of a noncontact IC card 15 that is likely to have been abused, which is indicated by, for example, that the user has entered but has not left the gate.

The card ID number on the blacklist is properly registered in the server 50 by a security administrator, and is sent to and registered in the gate apparatus 20 through the user identification apparatus 30.

The sending and receiving part 25 sends and receives data to and from the user identification apparatus 30.

The gate-side control part 26 is configured of a CPU, a ROM, and a RAM, and executes operation control over the individual parts.

The user identification apparatus 30 is configured to connect a sending and receiving part 31, an image capturing part 32, a face data extracting part 33, a face verifying part 34, an identification-side storing part 35, a communication part 36, an input unit 38, and a display unit 39 to an identification-side control part 37.

The sending and receiving part 31 sends and receives data to and with the gate apparatus 20, and sends verified card data relating to the verified noncontact IC card to the gate apparatus 20.

The image capturing part 32 captures the taken image data from the camera 10, and sends the taken image data captured to the face data extracting part 33.

The face data extracting part 33 recognizes the face of a person in the taken image data, and acquires face data from the recognized face. The face data is set to data relating to the face such as face image data extracted from the taken image, or characteristic data relating to the positional relationship of individual face parts (eyes, a nose, a mouth, and ears) acquired from the face image.

The face verifying part 34 verifies the face data acquired by the face data extracting part 33 against the face data that is registered in the server 50 as a registered user beforehand, sent from the server 50 and stored in the identification-side storing part 35, and then determines whether the same person exists.

The identification-side storing part 35 is configured of a storage device such as a hard disc or flash memory, and stores user data (including face data and card data) received from the server 50.

The communication part 36 executes data communication with the server 50.

The identification-side control part 37 executes operation control over the individual parts.

The input unit 38 is configured of an input unit such as a mouse or a keyboard, and accepts maintenance input or the like by security guards.

The display unit 39 is configured of a display unit such as a CRT monitor or liquid crystal monitor, and displays an error message or the like in accordance with the control by the identification-side control part 37.

The server 50 is configured to send and receive data to and from the user identification apparatus 30 through the communication part 36.

The server 50 is connected to the multiple user identification apparatus 30 (30A, 30B), and the multiple identification apparatus 30 can be managed by a single server 50.

In addition, the server 50 is a server-type computer, and it is well known that the server has an input unit formed of a mouse or a keyboard, a display unit formed of a CRT monitor or liquid crystal monitor, a control part formed of a CPU, a ROM, and a RAM, a server-side storing part formed of a hard disc, a communication part formed of a LAN board or the like, and a recording medium processing part formed of an FD drive or CD-ROM drive.

By the configuration above, the server 50 manages users at all the entrances 3 to allow the user identification apparatus 30 to monitor the entrance 3 as a unit and to allow the gate apparatus 20 to determine whether to permit passing or not.

Next, the server-side storing part of the server 50 and registered user data 71 to be stored in the identification-side storing part 35 of the user identification apparatus 30 will be described with reference to a data configuration diagram shown in FIG. 3.

The registered user data 71 is configured of card ID number data, valid duration data, a passable gate data, and face data.

The card ID number data stores a number uniquely assigned to a noncontact IC card 15.

The valid duration data stores valid duration given to the noncontact IC card 15 with commencement and termination. Furthermore, the valid duration given to a noncontact IC card 15 is decided based on authorization held by a user having that noncontact IC card 15.

The passable gate data stores a passable gate (entrance 3) with the noncontact IC card 15. Moreover, the passable gate allocated to a noncontact IC card 15 is decided based on authorization held by a user having that noncontact IC card 15.

The face data stores the face data of a user having a noncontact IC card 15.

By the configuration above, the face data that identifies users, and the valid duration data and the passable gate data that determine whether to permit passing of the gate or not can be managed at a unit of a user using the card ID number as a key.

In addition, the registered user data 71 is managed in an integrated fashion by addition, alternation and deletion through the server 50, and the server 50 sends the registered user data 71 to each user identification apparatus 30 to allow each user identification apparatus 30 to execute the update process.

Next, verified data 72 stored in the gate-side storing part 24 of the gate apparatus 20 will be described with reference to a data configuration diagram shown in FIG. 4.

The verified data 72 is the user data (noncontact IC card data) that has been verified by the user identification apparatus 30 against face data and is configured of received time data, card ID number data, valid duration data, and passable gate data.

The received time data stores the time when data is received from the user identification apparatus 30.

The card ID number data stores a number uniquely assigned to a noncontact IC card 15.

The valid duration data stores valid duration given to that noncontact IC card 15 with commencement and termination. Furthermore, the valid duration given to the noncontact IC card 15 is decided based on authorization held by a user having that noncontact IC card 15.

The passable gate data stores a passable gate (entrance 3) with that noncontact ID card 15. Moreover, the passable gate allocated to the noncontact ID card 15 is decided based on authorization held by a user having that noncontact ID card 15.

By the configuration above, the gate apparatus 20 can determine whether the noncontact ID card 15 read by the card reading part 22 of the gate apparatus 20 permits the user thereof to pass the gate.

Next, a pre-verification process that verifies users coming to the gate beforehand by face data will be described through a process flow chart illustrating the operation of the identification-side control part 37 of the user identification apparatus 30 shown in FIG. 5.

Figure 6:
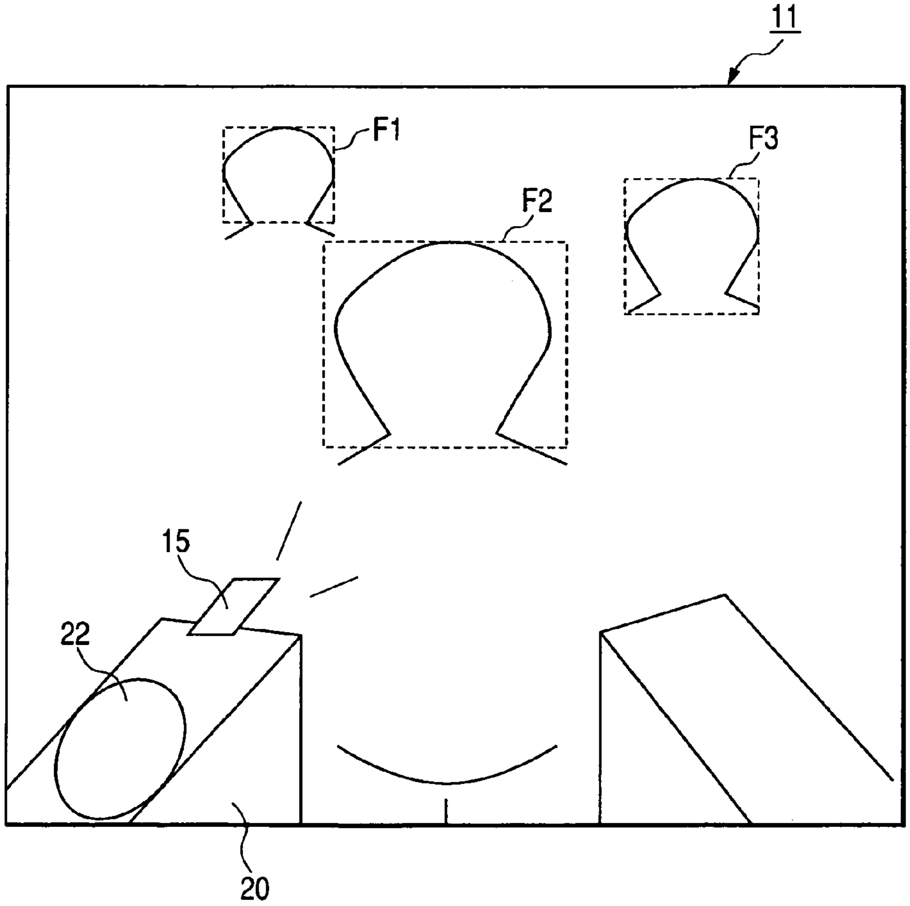
FIG. 6 is a conceptual diagram illustrating a taken image.

First, the camera 10 takes an image of an aisle to the gate or a space before the gate, and obtains the taken image 11 shown in a conceptual diagram of FIG. 6 (Step n1).

The identification-side control part 37 can extract face data by the face data extracting part 33 when people's faces F (F1, F2, F3) are in the taken image (Step n2: YES).

When people's faces in the taken image cannot be identified and thus face data cannot be extracted, again return to Step n1 to obtain a taken image (Step n2: NO).

Here, since the camera 10 takes motion pictures by video shooting, the image of the face F of a person coming to the gate appears as magnified and moved from up to down in the taken image 11.

The taken image 11 is used to acquire face data from the motion picture, the existence of the face F of the person is recognized, and the face F of the recognized person is tracked to prevent the face F of the same person from being overlappingly acquired.

For recognizing the face F of a person, the positional relationship of individual face items such as eyes, a nose, and a mouth are expressed by several characteristic points. When the similarity between the characteristic points and templates prepared beforehand exceeds a given threshold value, the face image of the person is recognized as the face F of that person.

For face data for verification, face data formed of finer characteristic points than those when used for recognizing the face F of the person as described above is extracted from the static image of the face at the angle suitable for verifying face data in the static image included in the motion picture.

The identification-side control part 37 verifies by the face verifying part 34 whether the same person as the extracted face data exists in the face data of the registered user data 71 stored in the identification-side storing part 35 (Step n3).

In verification at this time, it is determined as the same person when the similarity between the characteristic points exceeds a given threshold value.

When the face data exceeding the given threshold value does not exit in the registered user data 71, it can be determined that that person is not a registered user and the corresponding card ID number does not exist as well.

Return to Step n1 until the registered user can be identified from the face data extracted at Step n2. When identified (Step n4: YES), the card data of the identified registered user is extracted from the registered user data 71 (Step n5).

The card data to be extracted at this time is configured of the card ID number, the valid duration, and the passable gate.

The identification-side control part 37 simultaneously sends the card data to all the gate apparatus 20 (20*a*, 20*b*, and so on) connected to the user identification apparatus 30 by the sending and receiving part 31 (Step n6), and returns to Step n1 to repeat the series of steps so far.

By the operation above, the user before the gate can be identified by the user identification process (Steps n1 to n4), and the card data of the user identified by the verified data sending process (Steps n5 to n6) can be sent as the verified data to the gate apparatus 20.

For a user who was verified not to exist in the registered users, the card data thereof is not sent, and the person is rejected to pass through the gate. Also, those who just pass by the front of the gate can be allowed to pass across without unnecessarily raising an alert.

Next, a verified data control process will be described with reference to a process flow chart illustrating the operation of the gate-side control part 26 of the gate apparatus 20 shown in FIG. 7.

The gate-side control part 26 waits until it receives verified data by the sending and receiving part 25 (Step p1).

When it receives verified data, it stores the received verified data as verified data 72 in the gate-side storing part 24 (Step p2).

The gate-side control part 26 refers to the received time in the verified data 72 whether there is verified data that has elapsed for a given time period or longer from the received time (30 minutes, for example) (Step p3).

When there is the verified data that has elapsed for a given time period or longer, it deletes the verified data from the gate-side storing part 24 (Step p4), and returns to Step p1 to repeat the series of steps so far.

By the operation above, the gate apparatus 20 can add and store the verified data received from the user identification apparatus 30 in the verified data 72 of the gate-side storing part 24 at any time, and can delete the old verified data that has elapsed for a given time period from the verified data 72.

Accordingly, the number of items of the verified data stored in the gate-side storing part 24 can be maintained at the minimum necessity level, the comparative targets for determining whether to permit passing or not at a passage verification process, described below, are reduced to allow determination at a high speed.

Next, a passage verification process will be described with reference to a process flow chart illustrating the operation of the gate-side control part 26 of the gate apparatus 20 shown in FIG. 8.

The gate-side control part 26 waits until it receives a signal from a noncontact ID card 15 by the card reading part 22 (Step s1).

When it receives the signal, the card reading part 22 reads card data such as the card ID number stored in the noncontact ID card 15 (Step s2).

The gate-side control part 26 allows the determining part 23 to determine whether the read card data exists in the verified data 72 stored in the gate-side storing part 24 (Step s3).

Furthermore, it allows the determining part 23 to determine whether the card data is valid, that is, the duration of the verified data 72 is not expired and the gate is included in the passable gate to be valid (Step s4).

Moreover, the determining part 23 determines whether the card data exists in a blacklist (Step s5).

When even a single item is found NO at Steps s3 or s4, or YES in step s5, that is, when the card data falls in any one of the items the card data does not exist in the verified data 72, the card data is invalid, and the card data exists in the blacklist, the gate-side control part 26 determines not to permit passing, closes the gate door 21 (Step S6), and ends the process.

When it is all determined as YES at Steps s3 and s4, and NO in step s5, that is, when the card data exists in the verified data 72, the card data is valid, and the card data does not exist in the blacklist, the gate-side control part 26 determines to permit passing and opens the gate door 21 (Step s7).

Then, the relevant verified data is deleted from the verified data 72 of the gate-side storing part 24 (Step s8), and the process is ended.

At Step s8, all the relating gate apparatus 20 are set to delete the relevant verified data from the verified data 72 of the gate-side storing part 24.

More specifically, a gate apparatus 20 (the gate apparatus 20*a*, for example) sends a signal to delete the verified data 72 to all the other gate apparatus 20 (20*b*, 20*c*, and so on) which are connected to the user identification apparatus 30 (the user identification apparatus 30A, for example) to which that gate apparatus (gate apparatus 20*a*) is connected.

The other gate apparatus 20 (20*b*, 20*c*, and so on) received the delete signal delete the relevant verified data from the verified data 72 of the gate-side storing part 24.

Accordingly, the verified data 72 stored in the gate-side storing part 24 is synchronized among the gate apparatus 20 disposed side by side with a single gate (the gate A, for example), and it is configured not to generate mismatching among the gate apparatus 20 because of data mismatch.

In this manner, by deleting the card data from all the gate apparatus 20 disposed side by side at the same place, it is possible to prevent such abuse of a card that a user is verified on his/her noncontact ID card 15 by the gate apparatus 20*a* to pass, tosses the noncontact IC card 15 to another user, and the received user is verified on the noncontact ID card 15 by the different gate apparatus 20*b* to pass.

By the operation above, the gate-side control part 26 retrieves data matched with the card data of the noncontact ID card 15 of the parson to pass base on a few items of the verified data 72 stored in the storing part 24, and allows only the users having passage authorization to pass.

Since people who abuse another person's noncontact ID card 15 or temporarily borrow a noncontact ID card 15 are not verified by the pre-verification process as described with reference to FIG. 5, the verified data 72 matched with such noncontact ID cards 15 is not stored in the verified data 72 of the gate-side storing part 24 and is determined not to pass.

In this manner, face verification beforehand and card verification when passing through the gate can prevent the noncontact ID card 15 from being abused by another person.

Furthermore, the determination time when passing through the gate can be reduced, and users can be passed with no jam even though many registered users want to pass through the gate at the same time.

Moreover, even when multiple users are taken in the taken image 11, the verified data corresponding to the individual users is sequentially stored as the verified data 72 in the gate-side storing part 24, and the verified data of all the users can be accumulated and stored.

Therefore, even in jams because of the start of working hours and mealtime, multiple users can be determined as whether to be permitted to pass or not with no problem.

Furthermore at this time, even through the sequence of users that has verified by the face verifying part 34 of the user identification apparatus 30 is varied from the sequence of users actually passing through the gate, the verified data 72 relating to all the users in the taken image 11 is stored in the gate-side storing part 24, and thus the users can be determined as whether to be permitted to pass or not with no problem.

Figure 8:
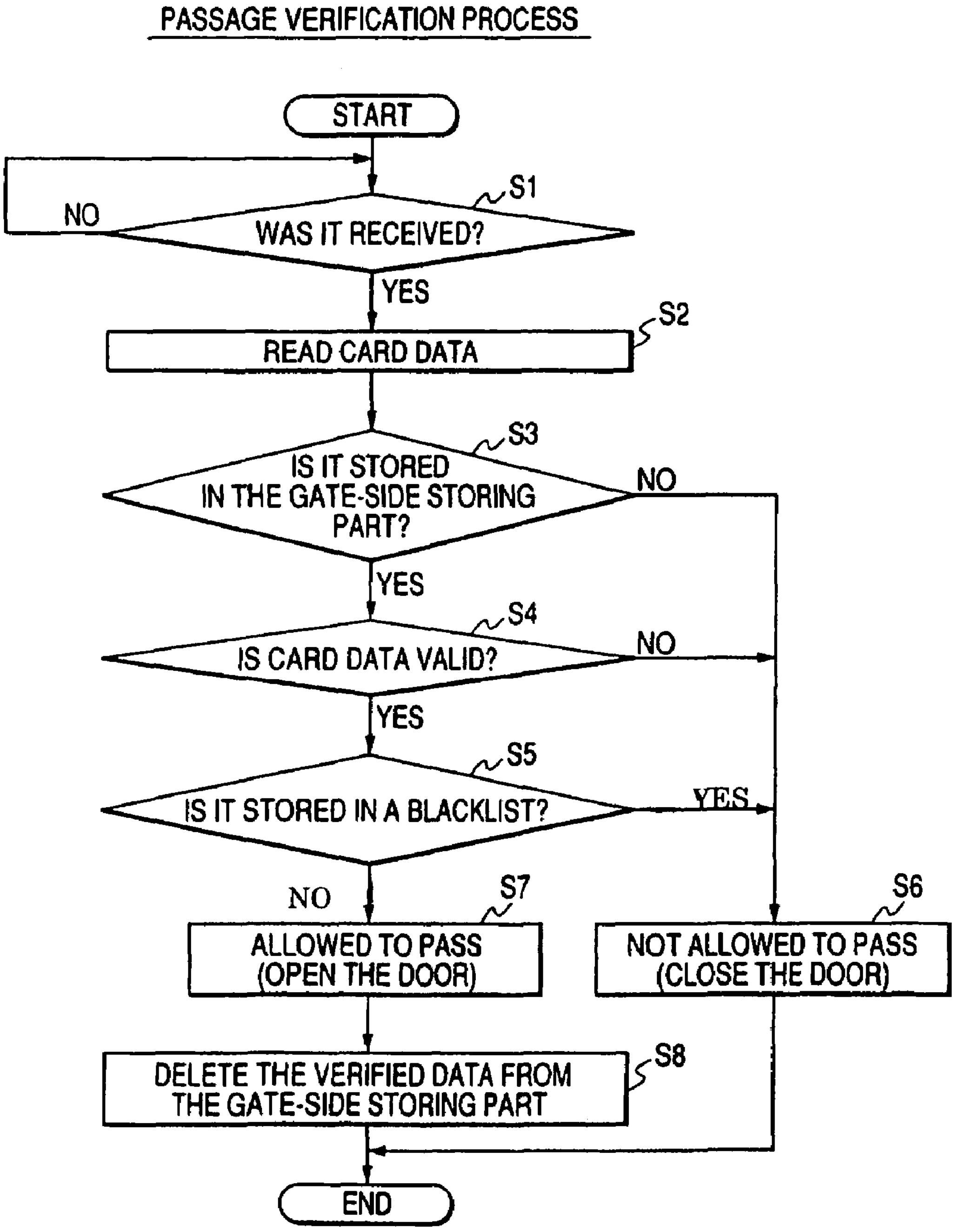
FIG. 8 is a process flow chart illustrating the operation of the gate-side control part which performs a passage verification process.

Moreover, in the embodiment described above, the configuration is acceptable that Step s5 in FIG. 8 is deleted not to check the blacklist.

In this case, the gate-side storing part 24 of the gate apparatus 20 is configured not to store blacklist data.

Accordingly, one determination step is reduced to allow determination as whether to permit passing or not at a faster speed.

In addition, the configuration is acceptable that Step s4 in FIG. 8 is deleted not to determine whether card data is valid. Also in this case, one determination step is reduced to allow determination as whether to permit passing or not at a faster speed.

Figure 5:
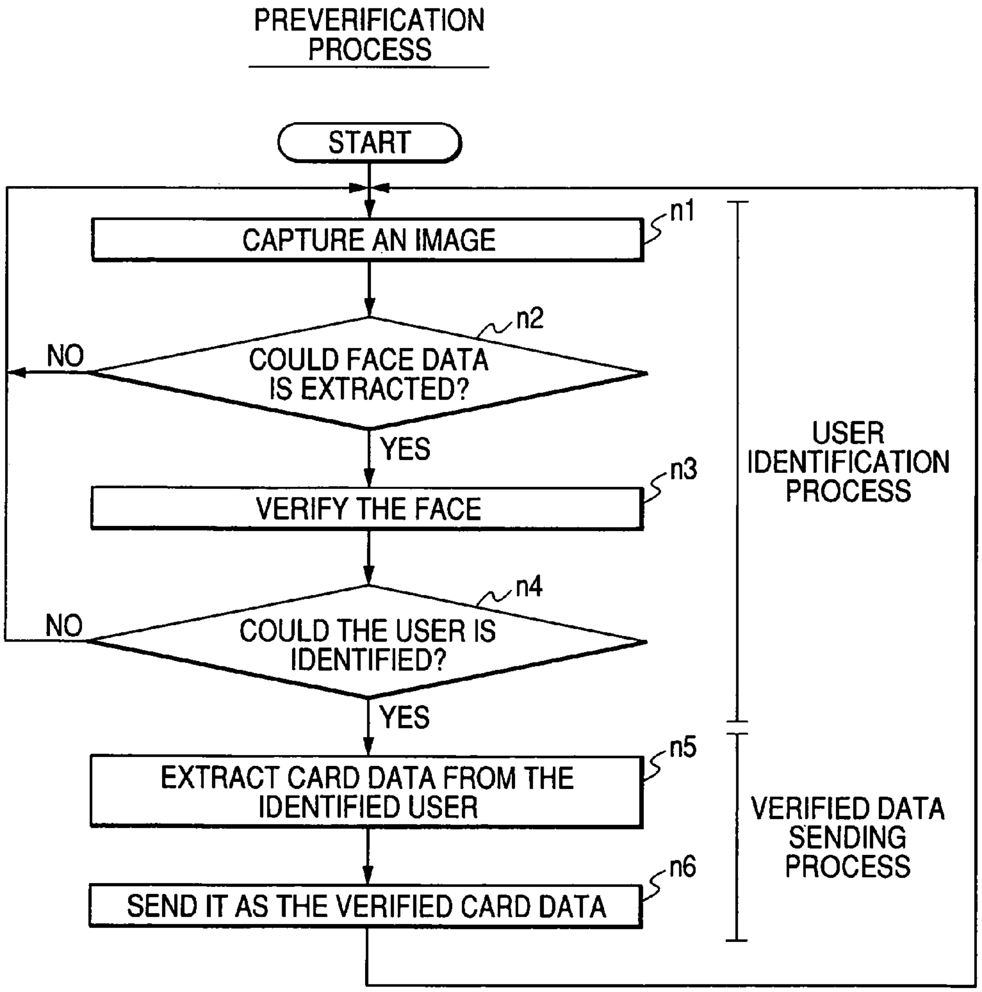
FIG. 5 is a process flow chart illustrating the operation of an identification-side control part which performs a pre-verification process.

Here, when Step s4 is deleted, it may be configured that card data is determined as whether to be valid at Step n5 in FIG. 5 and only valid card data is sent.

More specifically, it may be configured that card data is extracted only when the noncontact ID card 15 is passable through the gate from the valid duration and the passable gate.

Accordingly, the determination speed of the gate apparatus 20 can be accelerated as the security level is maintained.

Besides, when Step s4 is deleted, it may be configured that the identification-side storing part 35 of a user identification apparatus 30 stores only the data of the registered user who is passable through the gate monitored by that user identification apparatus 30 and has a card of valid duration.

In this case, the user who is not allowed to pass through the gate properly is rejected to pass as similar to the user not registered, and thus the determination time and the retrieval time are reduced to accelerate the process to determine whether to permit passing or not.

Furthermore, in this case, when the server 50 is set to update the registered user data 71 of the user identification apparatus 30 every day, the registered user data 71 stored in the identification-side storing part 35 of the user identification apparatus 30 can be formed only of the card ID numbers the valid duration of which is not expired.

Moreover, the verified data 72 stored in the gate-side storing part 24 of the gate apparatus 20 can be formed only of the card ID numbers.

Accordingly, the data volume is reduced to shorten the access time to data.

Next, as another embodiment, description will be made of the configuration that users who want to pass through gate are grouped under the registered users with similar characteristic points, and any users grouped are allowed to pass even though they want to pass through any gates.

In this case, at Step n3 in FIG. 5 in the previous embodiment, it is set that the similarity between the characteristic points exceeds a given threshold value and multiple users are identified in the order of higher similarity.

Furthermore, at Step n5 in FIG. 5, it is set that the card data of the identified multiple people is extracted and the identification-side control part 37 assigns proper group data (000A, for example) to the multiple people.

Therefore, as shown in a data illustration in FIG. 9, verified data 72 which include the respective data the received time, the card ID number, the valid duration, and the passable gate as well as the group data can be obtained.

Then, at Step n6 in FIG. 5, it is set that the verified data 72 added with the group data is sent to the gate apparatus 20.

Figure 7:
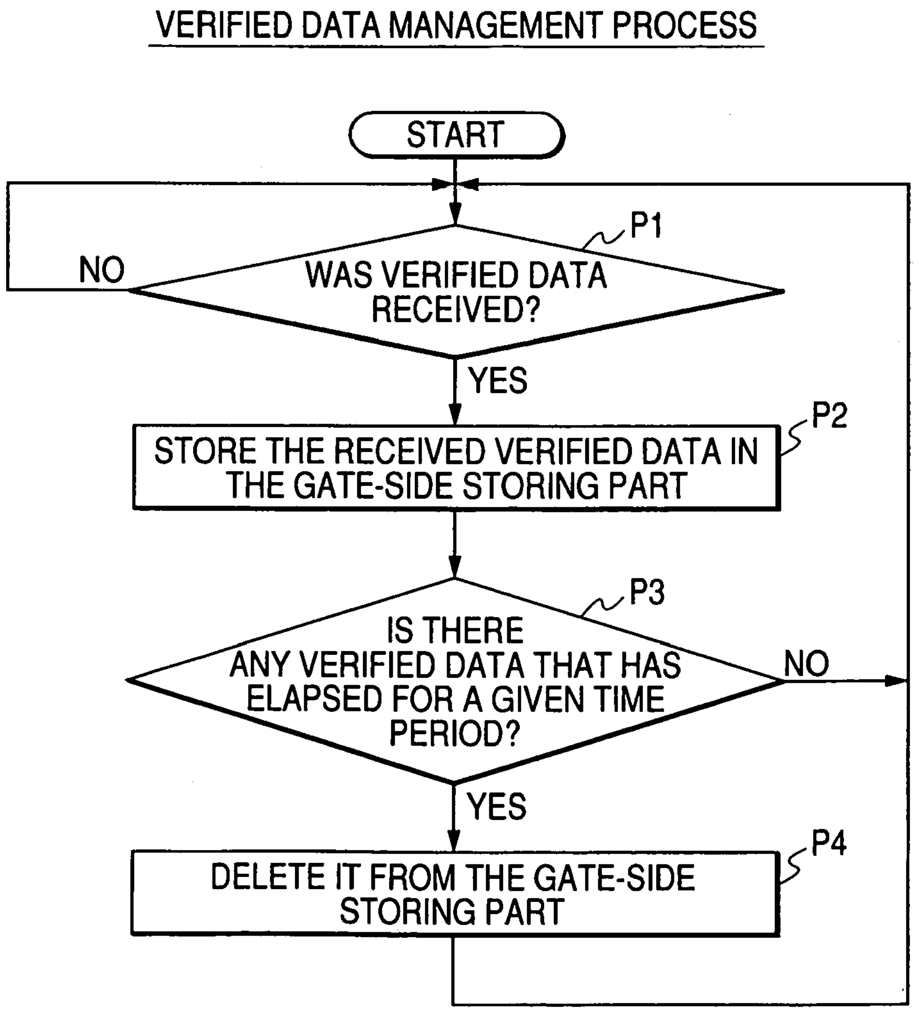
FIG. 7 is a process flow chart illustrating the operation of a gate-side control part which performs a data control process.

In the gate apparatus 20, when the verified data 72 is stored in the gate-side storing part 24 at Step P2 in FIG. 7, the verified data 72 added with group data is stored.

Moreover, at Step s8 in FIG. 8, it is set that in addition to verified data matched with the card data read at Step s2, verified data set to the same group as that of the verified data is deleted.

The other configurations and operations are the same as those of the embodiment described before, and thus the detailed description is omitted.

By the configurations and operations above, users are properly allowed to pass even though a change is observed in the face such as changes in users by hairstyles and eyeglasses.

Furthermore, since the verified data set to the same group is deleted from the gate-side storing part 24 of the gate apparatus 20 at the time of passing, unnecessary data can be prevented from remaining in the gate-side storing part 24 of the gate apparatus 20 and thus the determination time can be prevented from being prolonged because of an increase in data.

Figure 10:
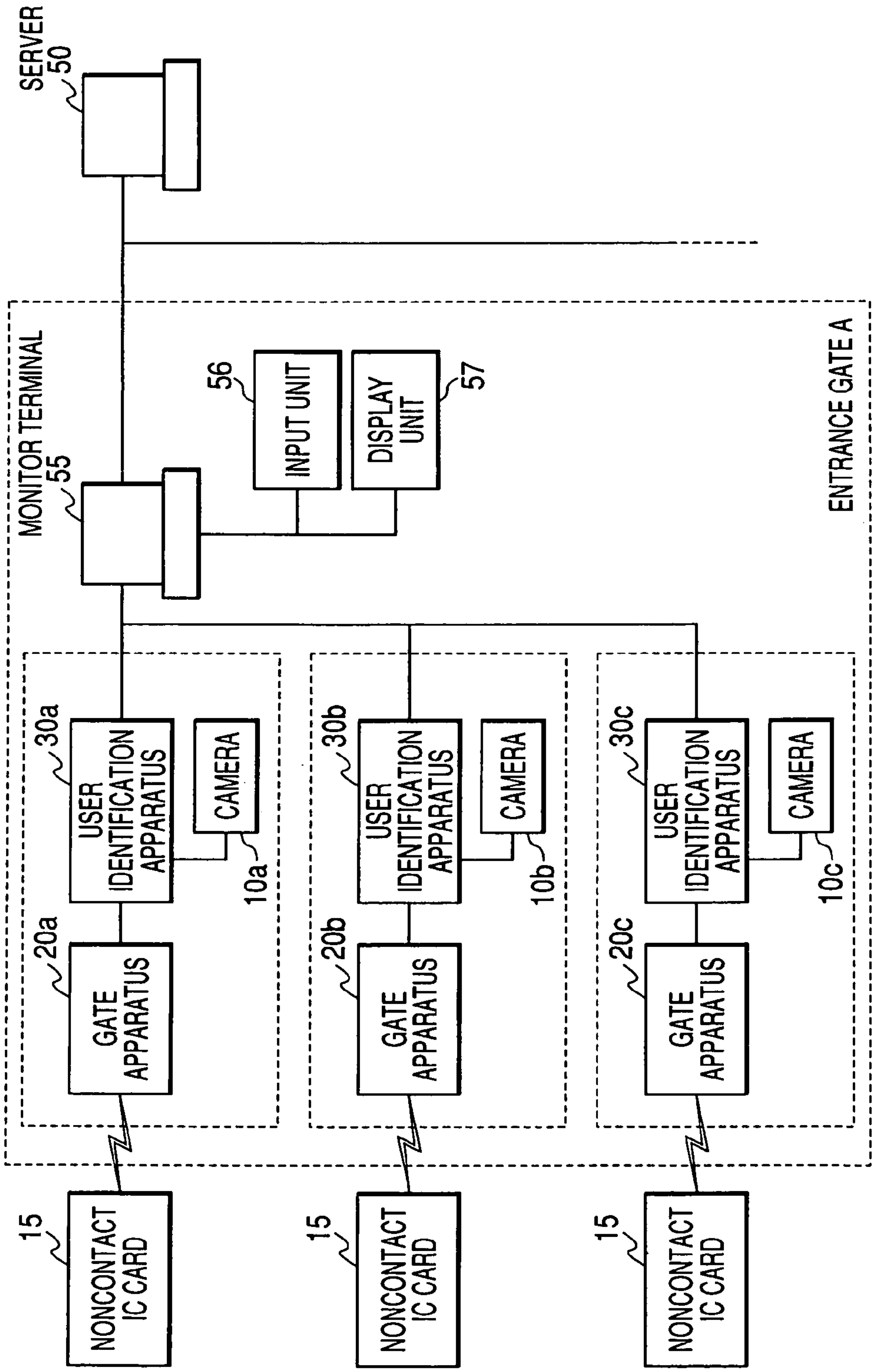
FIG. 10 is a system configuration diagram illustrating a gate system of another embodiment.

In the individual embodiments described above, as shown in a system configuration diagram in FIG. 10, it may be configured that instead of providing the input unit 38 and the display unit 39 are to the user identification apparatus 30, a monitor terminal 55 formed of a personal computer and having an input unit 56 and a display unit 57 is connected to the user identification apparatus 30.

In this case, it may be configured that the camera 10 (10*a*, 10*b*, 10*c*) and the user identification apparatus 30 (30*a*, 30*b*, 30*c*) are each provided to a single gate apparatus 20 (20*a*, 20*b*, 20*c*) and the monitor terminal 55 is connected to a server 50 as well as to all the user identification apparatus 30.

Figure 11:
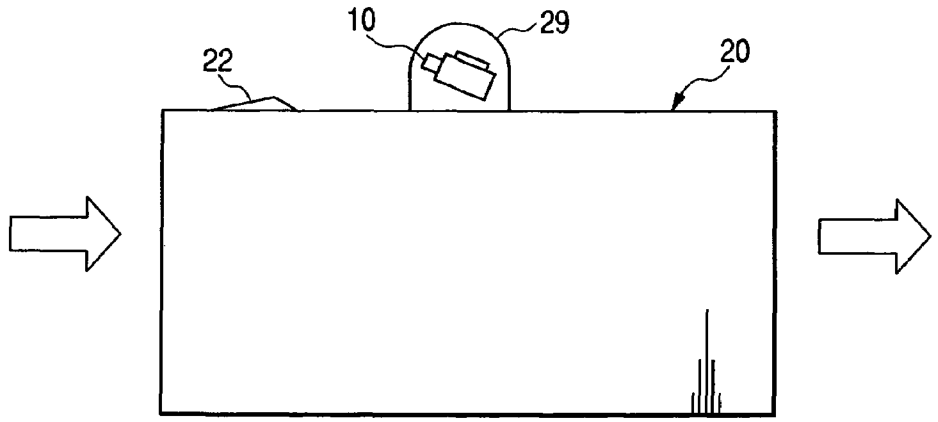
FIG. 11 is a side view illustrating a gate apparatus of another embodiment.

Moreover, as shown in a side view illustrating a gate apparatus 20 in FIG. 11, it may be configured that the camera 10 is mounted on the gate apparatus 20 with the shooting direction thereof set obliquely upward to take the image of the user's face from obliquely downward.

In this case, it may be configured that the camera 10 is protected by a transparent or translucent protection member 29 and the camera 10 takes the image of a user through the protection member 29.

Accordingly, the image of the user's face passing from left to right as shown by arrows in the drawing can be taken much closer.

In addition, it may be configured that the noncontact ID card 15 is replaced with other portable storage media such as a contact ID card having contact communication means to contact and communicate with a storing means for storing information, or a magnetic card provided with magnetic recording means.

In the correspondence between the configuration according to the invention and the embodiments described above, the image pickup means according to the invention corresponds to the camera 10 in the embodiments; similarly, the storage medium corresponds to the noncontact ID card 15;

the gate corresponds to the gate door 21;

the medium reading means corresponds to the card reading part 22;

the validating and verifying means corresponds to the determining part 23;

the medium information storing means and the blacklist storing means correspond to the gate-side storing part 24;

the medium information receiving means corresponds to the sending and receiving part 25;

the gate control means and the medium information deleting means correspond to the gate-side control part 26;

the medium information sending means corresponds to the sending and receiving part 31;

the face information extracting means corresponds to the face data extracting part 33;

the identification and verifying means corresponds to the face verifying part 34;

the registered user data storing means corresponds to the identification-side storing part 35;

the group creating means corresponds to the identification-side control part 37;

a given time corresponds to Steps p4, s8;

the passage relating information corresponds to the valid duration and the passable gate; and the face information corresponds to the face data.

The invention is not limited only to the configurations of the embodiments described above, which can attain many embodiments.

What is claimed is:

1. A gate system comprising:

a user identification apparatus which identifies a registered user who is matched with a user who wants to pass through a gate from registered users; and a gate apparatus which forms the gate, wherein the user identification apparatus comprises:

image pickup means which takes an image of the face of the passing user before the user reaches the gate;

identification and verifying means which identifies a registered user from the taken image; and medium information sending means which sends medium information about a storage medium carried by the registered user to the gate apparatus, the information being stored in association with the identified registered user, and wherein the gate apparatus comprises:

medium information receiving means which receives the medium information from the user identification apparatus;

medium reading means which reads the medium information from the storage medium carried by the user to pass; and validating and verifying means which verifies the read medium information based on the storage medium carried by the registered user against the medium information received by the medium information receiving means based on the taken image.

2. A gate system comprising:

a user identification apparatus which identifies a registered user who is matched with a user who wants to pass through a gate from registered users; and a gate apparatus which opens/closes the gate, wherein the user identification apparatus comprises:

registered user data storing means which stores face information of multiple registered users in association with medium information of a storage medium carried by the registered user;

image pickup means which takes an image of the face of the passing user before the user reaches the gate;

face information extracting means which extracts face information about the passing user from the taken image;

identification and verifying means which verifies the extracted face information against the face information of the registered users stored in the registered user data storing means and identifies a matched registered user; and medium information sending means which sends the medium information of the identified registered user to the gate apparatus, and wherein the gate apparatus comprises:

medium information receiving means which receives the medium information from the user identification apparatus;

medium information storing means which stores the received medium information;

medium reading means which reads medium information from a storage medium carried by the passing user;

validating and verifying means which verifies the read medium information based on the storage medium carried by the registered user against the medium information received by the medium information receiving means based on the face information; and gate control means which drive controls the opening/closing of the gate based on a verification result by the validating and verifying means.

3. The gate system according to claim 2, wherein the gate apparatus comprises medium information deleting means which deletes the medium information stored in the medium information storing means at a given time.

4. The gate system according to claim 3, wherein:

as the given time, the time when to verify medium information by the validating and verifying means of the gate apparatus is set, and medium information matched in the verification is set as the medium information to be deleted at this time.

5. The gate system according to claim 3, wherein:

the identification and verifying means of the user identification apparatus is set so as to identify multiple potential users as registered users matched with the passing users, the user identification apparatus is provided with group creating means which gives a single item of group information to the multiple potential users identified, medium information of each of the identified potential users and the group information are set to the information sent by the medium information sending means of the user identification apparatus, and the delete process executed by the medium information deleting means of the gate apparatus is executed at a unit of group.

6. The gate system according to claim 2, wherein when multiple passing users are in the taken image, extracting face information by the face information extracting means of the user identification apparatus is set to be executed on all the passing users.

7. The gate system according to claim 2, wherein:

passage relating information about whether the registered user is allowed to pass the gate or not is stored in the registered user data storing means of the users identification apparatus, and the validating and verifying means of the gate apparatus is set so as to turn the determination result as whether to permit passing or not from the passage relating information relating to the verified medium information to a verified result.

8. The gate system according to claim 2, wherein:

the gate apparatus comprises blacklist storing means which stores medium information of a storage medium to be rejected to pass, the validating and verifying means of the gate apparatus is set so that, as a condition to determine as passable, the medium information read from the storage medium is not matched with the medium information stored in the blacklist storing means.

* * * * *